United States Patent [19]
Schnittker

[11] Patent Number: 4,885,429
[45] Date of Patent: Dec. 5, 1989

[54] METAL CLAD CABLE CONNECTOR
[75] Inventor: William E. Schnittker, St. Louis, Mo.
[73] Assignee: Hubbell Incorporated, Orange, Conn.
[21] Appl. No.: 295,526
[22] Filed: Jan. 10, 1989
[51] Int. Cl.[4] .............................................. H02G 3/06
[52] U.S. Cl. ................................... 174/65 SS; 439/98
[58] Field of Search ...................... 174/65 SS, 51, 78; 439/98, 100, 862

[56] References Cited
U.S. PATENT DOCUMENTS

| | | | |
|---|---|---|---|
| 2,816,949 | 12/1957 | Curtiss | 174/51 |
| 3,567,843 | 3/1971 | Collins et al. | 174/51 |
| 4,022,966 | 5/1977 | Gajajiva | 174/65 SS |
| 4,046,451 | 9/1977 | Juds et al. | 174/75 |
| 4,273,405 | 6/1981 | Law | 439/98 |
| 4,490,576 | 12/1984 | Bolante et al. | 174/65 SS |
| 4,514,005 | 4/1985 | Fallon | 294/86.42 |
| 4,515,991 | 5/1985 | Hutchison | 174/65 SS |
| 4,549,037 | 10/1985 | Bawa et al. | 174/65 SS |
| 4,549,755 | 10/1985 | Kot et al. | 174/65 SS |
| 4,692,562 | 9/1987 | Nattel | 174/65 SS |

Primary Examiner—A. T. Grimley
Assistant Examiner—David A. Tone
Attorney, Agent, or Firm—Jerry M. Presson; Alfred N. Goodman

[57] ABSTRACT

A connector for metal clad cable that is easily made up and disassembled and is readily reusable. The connector includes a tubular body, a split grounding ring with straight and angled leading tines and angled trailing tabs slidably received in the body, an annular rubber grommet engaging the tabs on the grounding ring and received in the body, and a tubular closure threaded to the body for maintaining the grounding ring and grommet therein. The metal clad cable can be easily coupled to the connector by merely inserting an end of the cable through the closure, grommet and grounding ring, the angled leading tines and grommet engaging the outer surface of the cable. The cable can be easily uncoupled from the connector by unthreading the closure, pulling the cable out of the tubular body with the grounding ring and grommet attached thereto, and removing the ring and grommet from the cable. Since the grounding ring is split, it is readily removed from the cable and can be reused. To further couple the cable to the connector, a braided open wire mesh sleeve is attached to the tubular closure.

25 Claims, 3 Drawing Sheets

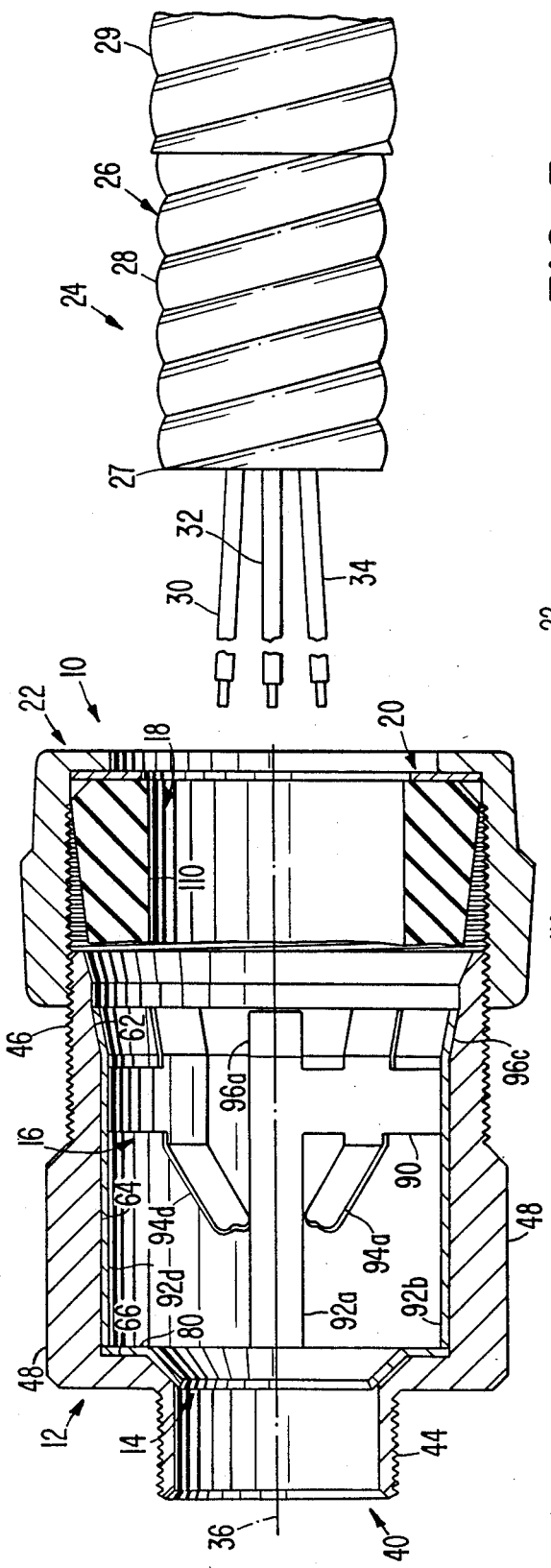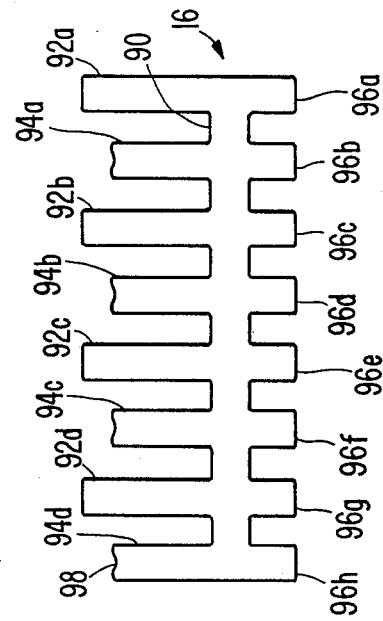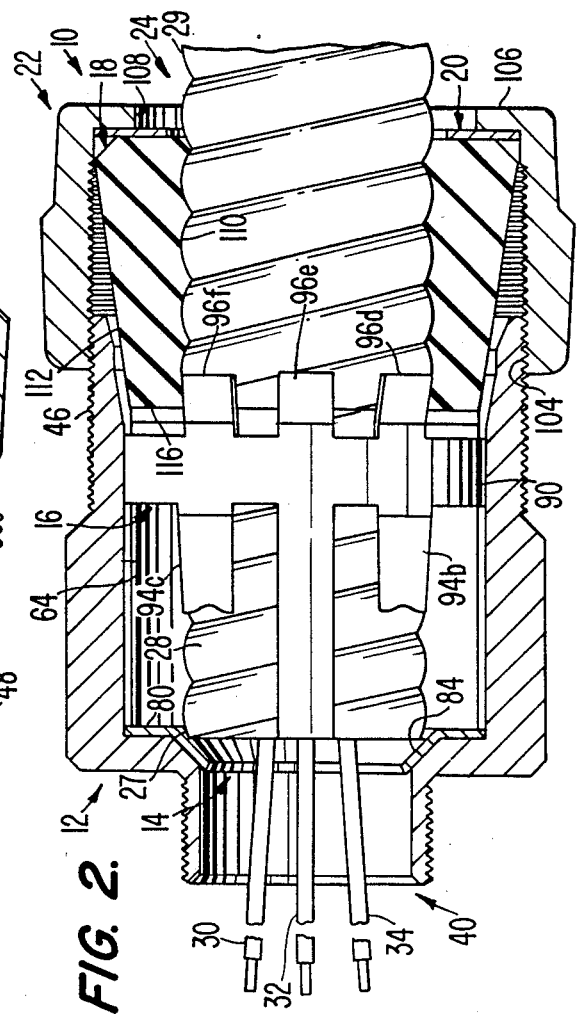

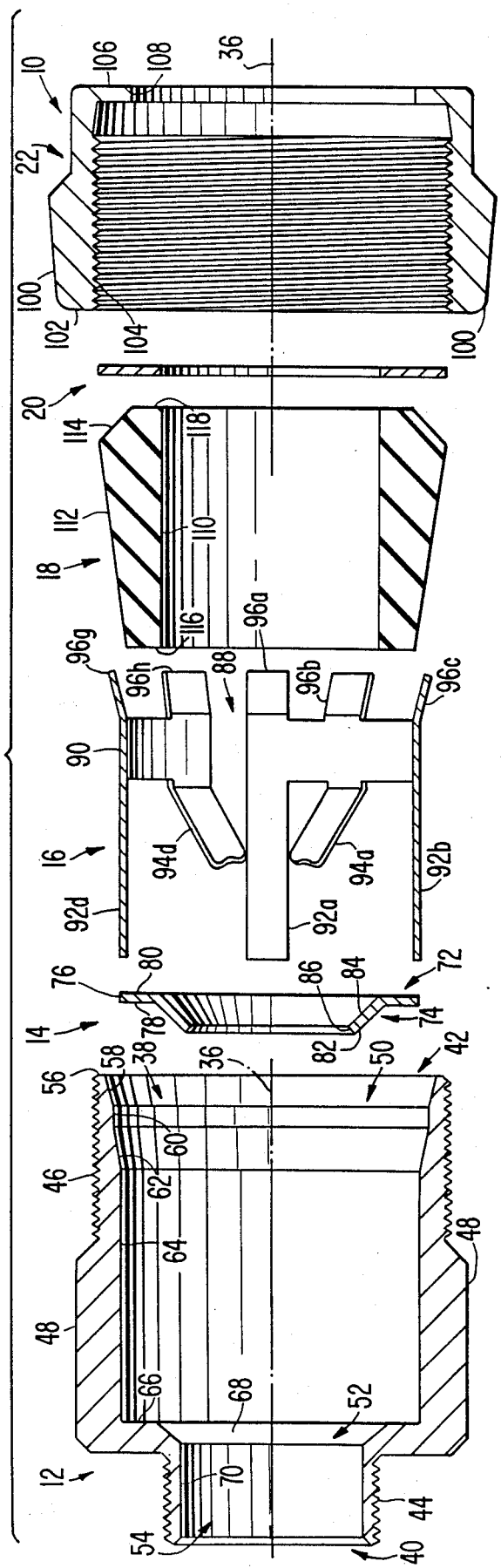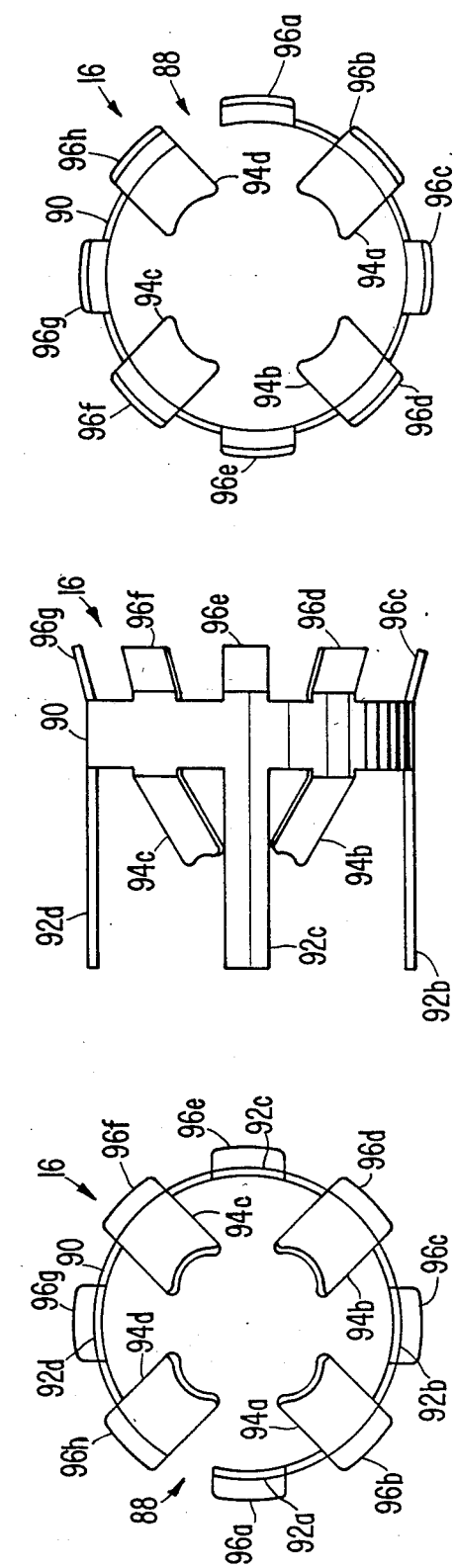

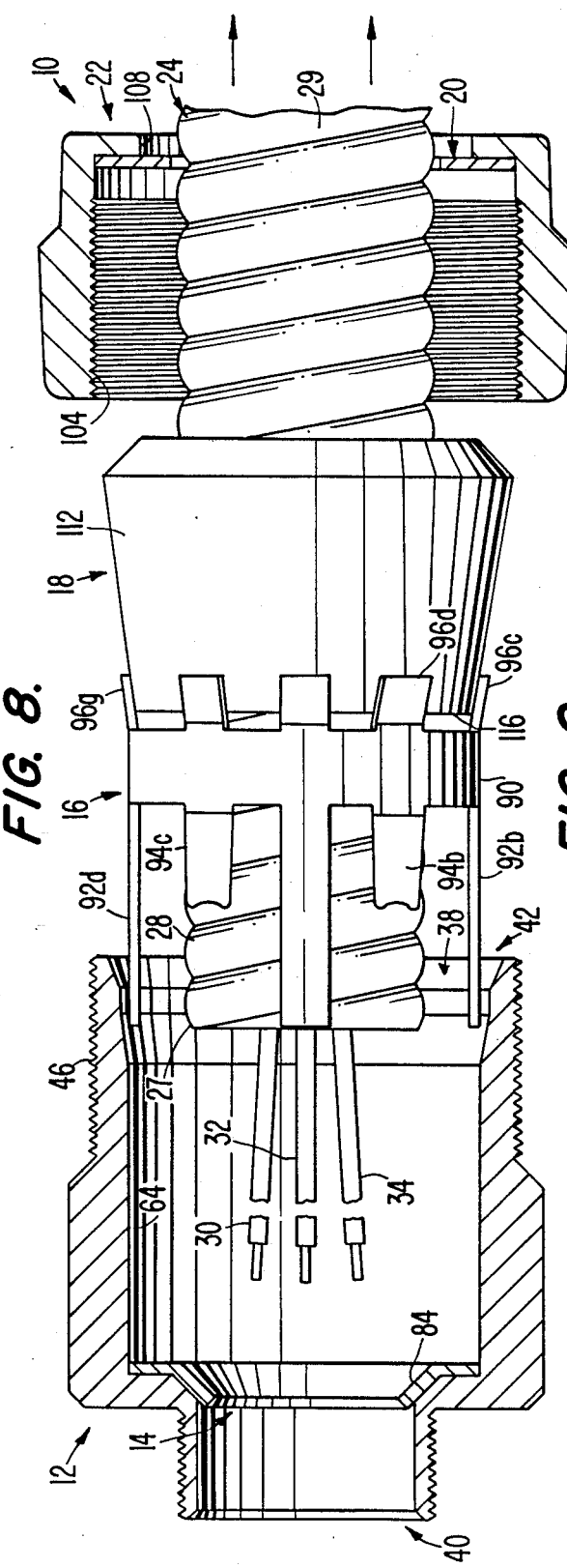

METAL CLAD CABLE CONNECTOR

FIELD OF THE INVENTION

The invention relates to a connector for metal clad cable. More particularly, the invention relates to a connector for metal clad cable having a tubular body, a grounding ring received in the tubular body, an annular rubber grommet engaging the grounding ring and received in the tubular body, and a tubular closure coupled to the tubular body for maintaining the grounding ring and grommet therein. The metal clad cable can be coupled to the connector by merely inserting an end of the cable through the closure, grommet and grounding ring. The cable can be uncoupled from the connector by disengaging the closure, pulling the cable out of the tubular body with the grounding ring and grommet attached thereto, and removing the ring and grommet from the cable.

BACKGROUND OF THE INVENTION

In many industrial and commercial buildings, the electrical wiring is often exposed and therefore subject to potential damage. To reduce the chances of inadvertent damage to these electrical wires, a flexible metal cladding is typically applied to these electrical wires. The cladding usually takes the form of a spirally-wrapped metal housing which is flexible and which has corrugations on the outer surface.

In use, the metal cladding provides significant protection against damage to the electrical wires therein. However, the metal clad cable, while solving one problem, introduces two additional factors which must be dealt with. First, it is important to ground the metal clad cable to avoid short circuits and electrical accidents. In addition, the cable is somewhat heavy and therefore needs a strong and durable connector at its end where the internal electrical wires are actually coupled to an electrical junction box.

Many attempts have been made in the past to provide connectors for metal clad cable that are also capable of grounding the cable; however, they have numerous disadvantages. For one thing, many of these prior devices cannot be reused once the metal clad cable is coupled thereto and thus additional costs are involved to provide additional connectors or internal parts. Second, many of the prior devices cannot be easily reused or disconnected from the metal clad cable. Finally, many of these prior metal clad connectors are complex to make, assemble, use and reuse.

Examples of these prior connectors are disclosed in the following U.S. Pat. Nos.: 2,816,949 to Curtiss; 3,567,843 to Collins et al; 4,022,966 to Gajajiva; 4,046,451 to Juds et al; 4,273,405 to Law; 4,490,576 to Bolante et al; 4,515,991 to Hutchison; 4,549,037 to Bawa et al; 4,549,755 to Kot et al; and 4,692,562 to Nattel.

Thus, there is a continuing need to provide improved metal clad cable connectors.

SUMMARY OF THE INVENTION

Accordingly, it is a primary object to provide a metal clad cable connector capable of securely coupling a metal clad cable to a junction box while providing a grounding mechanism therefor.

Another object of the invention is to provide a metal clad cable connector that can be reused and that can be reused or disconnected easily without the need for a new grounding mechanism.

Another object of the invention is to provide a metal clad cable connector in which the grounding ring is slidably received therein and can be slidably removed therefrom.

A further object of the invention is to provide a metal clad cable connector that is relatively simple to make, assemble, use and reuse.

A further object of the invention is to provide a grounding ring for a metal clad cable connector that is simple to make, use and reuse.

The foregoing objects are basically attained by providing a connector for metal clad cable having a distal end and an outer surface, the combination comprising a tubular body having a longitudinal axis, a through passageway extending along the longitudinal axis, and first and second open ends, the first and second open ends having external threads thereon, the through passageway having an inwardly facing surface and an axially directed stop shoulder, the stop shoulder being adapted to engage the distal end of the cable; a grounding ring received in the through passageway and engaging the inwardly facing surface and the stop shoulder, the grounding ring including a substantially annular central portion, a plurality of straight tines extending axially from the central portion and engaging the inwardly facing surface and the stop shoulder, and a plurality of angled tines extending inwardly from the central portion and adapted to engage the outer surface of the cable; a resilient grommet received in the through passageway and having first and second ends and a central passageway, the grommet first end engaging the grounding ring and the central passageway adapted to receive the cable therein; and a tubular closure having a first end with internal threads engaging the external threads on the tubular body second open end and a second end with an angular flange engaging the grommet second end, the tubular closure adapted to receive the cable therein.

The foregoing objects are also attained by providing a grounding ring for use in a connector for a metal clad cable, the combination comprising a substantially annular central portion having a longitudinal axis; a plurality of substantially straight leading tines extending from the central portion in a first direction, the straight leading tines being substantially parallel to the central portion longitudinal axis; a plurality of angled leading tines extending from the central portion in the first direction, the angled leading tines being angled inwardly towards the central portion longitudinal axis; and a plurality of angled trailing tabs extending from the central portion in a second direction opposite the first direction, the angled trailing tabs being angled outwardly away from the central portion longitudinal axis.

Other objects, advantages and salient features of the invention will become apparent from the following detailed description, which, taken in conjunction with the annexed drawings, discloses preferred embodiments of the invention.

DRAWINGS

Referring now to the drawings which form a part of this original disclosure:

FIG. 1 is a side elevational view in longitudinal section of the metal clad cable connector in accordance with the invention with the metal clad cable about to be inserted into the connector;

FIG. 2 is a side elevational view of the connector in longitudinal section with the grounding ring and cable in elevation, showing the metal clad cable fully inserted into the connector;

FIG. 3 is a reduced top plan view of the grounding ring in accordance with the invention before the ring is made up into its annular configuration;

FIG. 4 is a reduced, exploded side elevational view in longitudinal section of the various parts making up the connector shown in FIGS. 1 and 2;

FIG. 5 is a left end elevational view showing the front or leading end of the grounding ring also illustrated in FIGS. 1-4;

FIG. 6 is a side elevational view of the grounding ring shown in FIGS. 1-5;

FIG. 7 is a right end elevational view showing the rear or trailing end of the grounding ring shown in FIGS. 1-6;

FIG. 8 is a side elevational view of the connector in partial longitudinal section showing uncoupling of the metal clad cable from the connector; and FIG. 9 is a side elevational view in longitudinal section showing a slightly modified embodiment of the invention in which a braided open wire mesh sleeve is attached to the connector to further couple the cable to the connector.

DETAILED DESCRIPTION OF THE INVENTION

As seen in FIGS. 1-8, the metal clad cable connector 10 in accordance with the invention comprises a tubular body 12, an armor stop 14 received in the body, a grounding ring 16 slidably received in the body, a rubber grommet 18 also received in the body and engaging the grounding ring, a washer 20 engaging the grommet, and a tubular closure 22 threadedly engaged with the tubular body for maintaining the grommet and grounding ring therein. As seen by comparing FIGS. 1 and 2, the connector 10 is intended to receive the metal clad cable 24 therein so that the cable is grounded to the connector and so that the cable can be connected to other electrical lines in, for example, a junction box, to which the body 12 is coupled.

The metal clad cable 24 can be coupled to the connector 10 by merely inserting an end of the cable through the closure 22, grommet 18 and grounding ring 16 as seen in FIG. 2. The cable 24 can be uncoupled from the connector 10 as seen in FIG. 8 by merely disengaging the closure 22, pulling the cable out of the tubular body 12 with the grounding ring 16 and grommet 18 attached thereto, and removing the ring 16 and grommet 18 from the cable.

The metal clad cable 24 is conventional and comprises a spirally-wrapped metallic armor jacket or sheath 26 having a distal end 27, a corrugated outer surface 28 and a plurality of insulated electrical conductors 30, 32 and 34 located therein and extending past distal end 27. The outer surface 28, while being corrugated, is flexible, has a substantially continuous spiral groove therein, and has a generally tubular outer configuration. Covering the outer surface 28, except for about 1.0-1.5 inches from the distal end 27, is a thermoplastic outer jacket 29, preferably shrink-wrapped onto surface 28, formed from polyvinylchloride, and having a thickness of about 0.050-0.080 inch. The end of the outer jacket 29 preferably substantially aligns with the leading end of grommet 18 when cable 24 is fully inserted into the connector as seen in FIG. 2 with distal end 27 engaging stop 14.

The tubular body 12 is advantageously formed of a metal such as aluminum and as seen in FIG. 4 has a longitudinal axis 36, a through passageway 38 extending along the longitudinal axis, and first and second open ends 40 and 42. The first open end 40 is at the front or leading end of the body 12 and the second open end 42 is at the rear or trailing end of the body.

The first open end 40 has a reduced outer diameter relative to the main part of tubular body 12 and has external threads 44 thereon to couple the connector 10, for example, to an electrical junction box. The second open end 42 also has a slightly reduced outer diameter relative to the main part of the body and has external threads 46 thereon. Between the open ends of the body 12 are a series of external flats 48, so the tubular body 12 can be gripped and rotated as necessary via a suitable tool such as a wrench.

The through passageway 38 is divided into three cavities comprising a first cavity 50, a second cavity 52 and a third cavity 54.

The first cavity 50 is defined by a trailing, axially directed annular surface 56 at the second open end 42, an inwardly tapering frustoconical surface 58 tapering at an angle of about 15°, a cylindrical surface 60, a second inwardly tapering frustoconical surface 62, a second cylindrical surface 64 and a trailing, axially directed annular surface 66. As seen in FIG. 4, the two frustoconical surfaces 58 and 62 and the two cylindrical surfaces 60 and 64 define an inwardly facing surface in the through passageway 38.

The second cavity 52 has a frustoconical surface 68 tapering inwardly at an angle of 45°, or 30° if desired. This surface 68 extends forwardly from the cylindrical surface 66.

The third cavity 54 comprises a substantially cylindrical surface 70 which extends forwardly of body 12 from frustoconical surface 68 to the first open end 40.

The armor stop 14 is adapted to engage the distal end 27 of metal clad cable 24 as seen in FIG. 2 to aid in grounding the cable and also limit its axial and radial movement relative to the connector. As seen in FIG. 1, armor stop 14 abuts annular surface 66 in body 12, surface 66 and stop 14 thereby forming a rearwardly facing, axially directed stop shoulder for the cable.

The armor stop is preferably formed from metal such as aluminum and is advantageously press-fit into the position shown in FIG. 1 with the peripheral surface of the armor stop tightly engaging cylindrical surface 64 on body 12.

The armor stop 14 is basically a ring and has an annular portion 72 and a frustoconical portion 74 integrally formed together. The annular portion 72 has a substantially cylindrical outer surface 76, although this surface can be interrupted and reduced to provide, for example, three separate flanges for press-fitting the stop to cylindrical surface 64. The annular portion 72 has an annular leading surface 78 and an annular trailing surface 80. The annular leading surface 78 abuts rearwardly facing annular surface 66 on body 12 and the annular trailing surface 80 as seen in FIGS. 1 and 2 abuts the leading end of the grounding ring 16 as will be described in more detail hereinafter. The frustoconical portion 74 comprises a frustoconical leading surface 82 and a frustoconical trailing surface 84 with an aperture 86 therebetween through which the electrical conductors 30, 32 and 34 pass as seen in FIG. 2. Preferably, the frustoconical leading and trailing surfaces 82 and 84 taper inwardly and towards the front end of the connector at equal angles of about 45°, although these angles could be 30° if desired. As seen in FIG. 2, the distal end 27 of the cable 24 abuts frustoconical trailing surface 84 which aids in centering the cable relative to the tubular body 12.

As seen in FIG. 1, the armor stop 14 has portions located in each of the first, second and third cavities, 50, 52 and 54 defined in the through passageway 38 in body 12. Thus, the annular portion 72 is located in the first cavity 50, a portion of the frustoconical portion 74 is located in the second cavity 52, and another portion of the frustoconical portion 74 extends into the third cavity 54.

As seen in FIGS. 1-7, and most clearly in FIGS. 3-7, the grounding ring 16 is preferably formed of a metal such as stainless steel, is constructed from one piece of material and is resilient. Advantageously, the thickness of the material forming the grounding ring is about 0.020 inch. The grounding ring is initially constructed in a flat configuration as seen in FIG. 3 and then is rolled into a substantially annular configuration as seen in FIGS. 5 and 7 with a circumferential gap 88 therein. The outer periphery or circumference of the split grounding ring 16 is advantageously chosen to be slightly larger than the circumference of cylindrical surface 64 inside the tubular body 12. Thus, when the split grounding ring 12 is slid into the tubular body, it is circumferentially reduced slightly, via frustoconical surface 58, to provide a full slidable and slight interference fit engagement between the outer surface of the grounding ring and the inner cylindrical surface 64 on the tubular body. Thus, when inserted into the tubular body, the circumferential gap 88 is slightly reduced. Use of this gap reduces the need for exacting tolerances in the outer diameter of the ring and also allows the ring to be easily unrolled and removed from the metal clad cable 24 for reuse as will be described in more detail hereinafter.

The split grounding ring 16 is basically comprised of an annular central portion 90, four straight leading tines 92a-d, four angled leading tines 94a-d, and eight angled trailing tabs 96a-h. The tines and tabs extend from the central portion. While eight leading tines and eight trailing tabs are shown, for larger diameter connectors, 10 leading tines and 10 trailing tabs can be utilized.

The straight leading tines extend forwardly from the central portion substantially parallel to the longitudinal axis of the ring, which coincides essentially with longitudinal axis 36, form a substantially cylindrical array, and are substantially 90° apart around the annular central portion 90. The angled leading tines extend forwardly from the central portion and are angled inwardly towards the longitudinal axis of the ring through about 45°, and thus form a substantially frustoconical array, these angled leading tines also being spaced about 90° apart and located in between adjacent pairs of the straight leading tines. Advantageously, each of the angled leading tines is bent inwardly about a line slightly spaced from the leading edge of the central portion as seen in FIGS. 1, 2 and 4-8. The angled tines are bent inwardly so that the annular array defined by their distal ends is smaller than the diameter of the outer surface 28 of the cable to ensure engagement of these tines with the cable. Advantageously, the straight tines are longer than the angled, or bent, tines as seen in FIG. 3. The distal ends of the angled leading tines advantageously have an indentation or recess 98 which is curvilinear to aid in gripping the metal clad cable 24. In addition, advantageously, the end portion of each angled leading tine can be bent or cup-formed about its longitudinal axis as best seen in FIG. 5.

The eight trailing tabs extend from the rear or trailing edge of the central portion 90 and are bent outwardly at an angle of about 15°, thereby forming a substantially frustoconical array. The tabs are advantageously shorter than the angled leading tines and the bend lines are slightly spaced from the trailing edge of the central portion. The angled tines are evenly spaced about 45° apart along the central portion.

When inserted into the tubular body 12, the outer surfaces of the central portion 90 and the straight leading tines 92a-d engage cylindrical surface 64 as seen in FIGS. 1 and 2 and the outer surfaces of the trailing tabs 96a-h engage the frustoconical surface 62 on the inside of the body 12. In addition, the distal ends of the straight leading tines 92a-d abut the armor stop annular trailing surface 80 as also seen in FIGS. 1 and 2. Once the metal clad cable 24 is inserted into the connector, the distal ends of the angled leading tines 94a-d engage the outer surface 28 of the cable and are biased outwardly as seen in FIG. 2.

As best illustrated in FIG. 4, the tubular closure 22, also known as a gland nut, has a plurality of flats 100 on its outer surface so it can be gripped and rotated as desired via a tool such as a wrench. The closure comprises an annular leading end 102, an inner substantially cylindrical threaded portion 104 which can be threadedly engaged with external threads 46 on the second open end of the body 12, an annular flange 106 on the trailing end of the closure, and a cylindrical aperture 108 defined by the flange through which the cable is received.

The grommet 18 is advantageously annular and resilient and is preferably formed of rubber or any suitable elastomeric material. The grommet comprises an inner cylindrical surface 110, a first outer frustoconical surface 112, a second outer frustoconical surface 114, an annular leading surface 116 at its front or first end, and an annular trailing surface 118 at its rear or second end.

The inner cylindrical surface 110 has a diameter slightly larger than the outer diameter of the outer jacket 29 of the cable 24, but develops an interference fit with the cable once the cable is inserted into the connector and the gland nut is tightened, as seen in FIG. 2.

Advantageously, the outer frustoconical surface 112 on the grommet tapers forwardly and inwardly at an angle of about 9° which is slightly less than the 15° taper of the trailing tabs into which the front end 116 of the grommet is inserted as seen in FIGS. 2 and 8. Frustoconical surface 114 tapers rearwardly and inwardly at about 45° and the intersection of frustoconical surfaces 112 and 114 substantially engages the inner surface of closure 22.

Washer 20, seen in FIG. 4, is located between flange 106 on the closure 22 and the second end of the grommet to aid in pushing the grommet forward when the connector is made up.

Assembly and Disassembly

As seen in FIG. 1, connector 10 is fully constructed and ready to receive metal clad cable 24. The connector is constructed by connecting the various parts shown in FIG. 4.

Thus, first the armor stop 14 is press-fit into the tubular body 12 via second open end 42, and then the split grounding ring 16 is slidably inserted into the tubular body via that end. In its fully inserted configuration seen in FIG. 1, the distal ends of the straight leading tines 92a–d abut the armor stop and the outer surfaces of the straight leading tines 92a–d, central portion 90, and trailing tabs 96a–h abut and engage cylindrical surface 64 and frustoconical surface 62 on the body.

Next, the grommet 18 is inserted into the second open end 42 of body 12 and its front end 116 is inserted into and engaged with the inner surfaces of the trailing tabs 96a–h as seen in FIG. 2. Finally, the closure 22 with washer 20 in place is slid over the second open end and the grommet and is rotated relative to body 12 with the internal threads 104 thereon threadedly engaging the external threads 46 on the body. Advantageously, closure 22 is rotated an amount sufficient to slightly compress the grommet 12 so that it slightly outwardly expands and to assure that the grommet is fully received inside the tabs.

Then, to couple the metal clad cable 24 to the connector 10, the cable is inserted into the connector as seen in comparing FIGS. 1 and 2. During this insertion, the electrical conductors 30, 32 and 34 as well as the distal end 27, pass through the closure 22, washer 20, grommet 12 and grounding ring 16. When fully inserted, the distal end 27 of the cable abuts the armor stop 14 and the electrical conductors pass through the first end 40 of the body and extend outwardly therefrom where they can be electrically connected to any desired additional electrical conductors or other electrical devices. When the cable is inserted into the grounding ring 16, the angled leading tines 94a–d are biased outwardly to an angle shallower than their relaxed angle and these angled leading tines engage, under their natural resilience, the outer surface 28 of the cable as seen in FIG. 2.

The cable 24 is substantially centered relative to the body 12 via the abutment of the distal end 27 with the armor stop, engagement of the angled leading tines with the outer surface of the cable, and engagement of the inner surface 110 of the grommet with the outer jacket 29 of the cable. To form an interference fit between the grommet and the outer jacket, closure 22 is further rotated which axially compresses the grommet and radially reduces cylindrical surface 110.

Since the angled leading tines engage the irregular corrugated outer surface 28 of the cable, a force tending to pull the cable out of the connector is resisted since the grounding ring 16 cannot move rearwardly of the connector due to the engagement of the grommet with the grounding ring and washer 20.

Preferably before the cable 24 is inserted into the connector 10, the connector is coupled to an electrical junction box via threads 44 on the first open end 40 of body 12.

To uncouple the cable 24 from the connector 10, as seen in FIG. 8, the closure 22 is unthreaded and the cable is pulled out of the tubular body 12. Due to the engagement of the grounding ring with the cable and the grommet with the grounding ring and cable, when the cable is pulled out of body 12, it will carry the grounding ring and grommet attached thereto. This withdrawal is facilitated by the simple slidable engagement of the grounding ring 16 with the body 12. Then, the grounding ring can be unrolled and removed from the cable and the grommet slid off the end of the cable.

Since the grounding ring is split, it is readily removed from the cable and can be reused by being reformed into its annular configuration.

Thus, the connector 10 can be reassembled as shown in FIG. 1 and reused with additional metal clad cable.

Embodiment of FIG. 9

A slightly modified embodiment of the connector in accordance with the invention is shown in FIG. 9, the basic difference being a substitution of the washer 20 with a cable grip 120. Since the remaining parts of the connector shown in FIG. 9 are the same as those shown in FIGS. 1–8, similar reference numerals are utilized with the addition of a prime.

Cable grip 120 comprises an annular collar 122 having an annular flange 124 at its leading end and a braided open wire mesh sleeve 126 extending from its trailing end. Flange 124 is interposed between grommet 18' and flange 106' on closure 22' to maintain the cable grip 120 coupled to the connector.

Cable grip 120 is conventional and has the braided open wire mesh sleeve 126 swagged to it for a rigid connection.

Mesh sleeve 126 can be increased in diameter by means of an axially directed compression for receiving a metal clad cable therein, which would extend fully into the connector as shown, for example, in FIG. 2. The axial compression of the sleeve is then removed, and the sleeve radially reduces into a gripping engagement with the outer surface of the cable.

By using the cable grip 120, the metal clad cable is further coupled to the connector.

While advantageous embodiments have been chosen to illustrate the invention, it will be understood by those skilled in the art that various changes and modifications can be made therein without departing from the scope of the invention as defined in the appended claims.

What is claimed is:

1. A connector for metal clad cable having a distal end and an outer surface, the combination comprising:
    a tubular body having a longitudinal axis, a through passageway extending along said longitudinal axis, and first and second open ends,
    said first and second open ends having external threads thereon,
    said through passageway having an inwardly facing surface and an axially directed stop shoulder, said stop shoulder being adapted to engage the distal end of the cable;
    a grounding ring received in said through passageway and engaging said inwardly facing surface and said stop shoulder,
    said grounding ring including a substantially annular central portion, a plurality of straight tines extending axially from said central portion and engaging said inwardly facing surface and said stop shoulder, and a plurality of angled tines extending inwardly from said central portion and adapted to engage the outer surface of the cable;
    a resilient grommet received in said through passageway and having first and second ends and a central passageway, said grommet first end engaging said grounding ring and said central passageway adapted to receive the cable therein; and
    a tubular closure having a first end with internal threads engaging said external threads on said tubular body second open end and a second end with an annular flange engaging said grommet second end, said tubular closure adapted to receive the cable therein.

2. A connector according to claim 1, wherein said grounding ring has a circumferential gap therein.

3. A connector according to claim 1, wherein said grounding ring further includes a plurality of tabs extending rearwardly from said central portion and engaging said inwardly facing surface and said grommet first end.

4. A connector according to claim 3, wherein said tabs extend outwardly of said central portion at an angle of about 15°.

5. A connector according to claim 1, wherein said angled tines extend inwardly of said central portion at an angle of about 45°.

6. A connector according to claim 1, wherein said stop shoulder includes a stop ring received in said through passageway.

7. A connector according to claim 1, wherein said grounding ring is formed of resilient material and is slidably received in said through passageway.

8. A connector according to claim 1, wherein said inwardly facing surface includes a cylindrical portion,
said central portion and said straight tines engaging said cylindrical portion.

9. A connector according to claim 1, wherein said inwardly facing surface includes a frustoconical portion,
said grounding ring including a plurality of tabs extending from said central portion and engaging said frustoconical portion.

10. A connector according to claim 1, wherein said grommet has an inwardly tapering, frustoconical outer surface.

11. A connector according to claim 1, and further comprising
an annular collar coupled to said tubular closure, and
a braided open wire mesh sleeve coupled to said annular collar and adapted to receive the cable therein.

12. A connector for a metal clad cable, the combination comprising:
a tubular body having a longitudinal axis, a through passageway extending along said longitudinal axis, and first and second open ends,
said through passageway having an inwardly facing surface and an axially directed stop shoulder, said stop shoulder being adapted to engage the cable;
a grounding ring received in said through passageway and engaging said inwardly facing surface and said stop shoulder,
said grounding ring including a substantially annular central portion, a plurality of tines extending axially from said central portion and engaging said stop shoulder, a plurality of angled tines extending inwardly from said central portion and adapted to engage the cable, and a plurality of tabs extending outwardly from said central portion;
a resilient grommet received in said through passageway and having first and second ends and a central passageway, said grommet first end engaging said tabs and said central passageway adapted to receive the cable therein; and
a tubular closure having a first end releasably coupled to said tubular body second open end and a second end engaging said grommet second end, said tubular closure adapted to receive the cable therein.

13. A connector according to claim 12, wherein said plurality of tines engage said inwardly facing surface.

14. A connector according to claim 13, wherein said plurality of tabs engage said inwardly facing surface.

15. A connector according to claim 12, wherein said plurality of tabs engage said inwardly facing surface.

16. A grounding ring for use in a connector for a metal clad cable, the combination comprising:
a substantially annular central portion having a longitudinal axis;
a plurality of substantially straight leading tines extending from said central portion in a first direction, said straight leading tines being substantially parallel to said central portion longitudinal axis;
a plurality of angled leading tines extending from said central portion in said first direction, said angled leading tines being angled inwardly towards said central portion longitudinal axis; and
a plurality of angled trailing tabs extending from said central portion in a second direction opposite said first direction, said angled trailing tabs being angled outwardly away from said central portion longitudinal axis.

17. A grounding ring according to claim 16, wherein said substantially annular central portion has a circumferential gap therein.

18. A grounding ring according to claim 16, wherein, said angled leading tines are angled at about 45°, and said angled trailing tabs are angled at about 15°.

19. A grounding ring according to claim 16, wherein said plurality of straight leading tines comprises four of said straight leading tines,
said plurality of angled leading tines comprises four of said angled leading tines, and
said plurality of angled trailing tabs comprises eight of said angled trailing tabs.

20. A grounding ring according to claim 16, wherein each of said straight leading tines are longer than each of said angled leading tines.

21. A grounding ring according to claim 16, wherein each of said angled leading tines are longer than each of said angled trailing tabs.

22. A grounding ring according to claim 16, wherein said straight leading tines are substantially evenly spaced along said central portion,
said angled leading tines are substantially evenly spaced along said central portion, and
said angle trailing tabs are substantially evenly spaced along said central portion.

23. A grounding ring according to claim 16, wherein each of said angled leading tines has a distal end with an indentation therein.

24. A grounding ring according to claim 16, wherein each of said angled leading tines is located between a pair of adjacent straight leading tines.

25. A grounding ring according to claim 16, wherein said central portion, straight and angled leading tines, and angled trailing tabs are integrally formed together from a single piece of material,
said material being resilient.

* * * * *